United States Patent [19]

den Boef

[11] Patent Number: 4,972,312

[45] Date of Patent: Nov. 20, 1990

[54] MULTIPROCESS COMPUTER AND METHOD FOR OPERATING SAME HAVING CONTEXT SWITCHING IN RESPONSE TO A PERIPHERAL INTERRUPT

[75] Inventor: Johannes H. den Boef, Eindhoven

[73] Assignee: U.S. Philips Corporation, New York, N.Y.

[21] Appl. No.: 344,542

[22] Filed: Apr. 25, 1989

Related U.S. Application Data

[63] Continuation of Ser. No. 794,863, Nov. 4, 1985, abandoned.

[51] Int. Cl.$^5$ .............................................. G06F 9/46
[52] U.S. Cl. .............................. 364/200; 364/241.5; 364/280.8
[58] Field of Search ... 364/200 MS File, 900 MS File

[56] References Cited

U.S. PATENT DOCUMENTS

| | | | |
|---|---|---|---|
| 3,614,741 | 10/1971 | McFarland, Jr. et al. | 364/200 |
| 3,905,025 | 9/1975 | Davis et al. | 364/200 |
| 4,023,143 | 5/1977 | Braunstein | 364/200 |
| 4,152,761 | 5/1979 | Louie | 364/200 |
| 4,449,182 | 5/1984 | Rubinson et al. | 364/200 |
| 4,562,538 | 12/1985 | Berenbaum et al. | 364/200 |

OTHER PUBLICATIONS

Writing a Device Driver for VAX/VMS, Chapter 11, Digital Equipment Corporation, Apr. 1986.

*Primary Examiner*—Michael R. Fleming
*Assistant Examiner*—Debra A. Chun
*Attorney, Agent, or Firm*—Brian J. Wieghaus

[57] ABSTRACT

A multiprocess computer executes operating system routines and user processes. One specific peripheral apparatus has a preferential status in that it may emit attention interrupts and/or completion interrupts that relate to an I/O-operation. Only those interrupts find preferential treatment in that the associated interrupt has a higher priority level than the one(s) corresponding to the majority of the operating system routines. In contradistinction to all other user process interrupts the above attention and completion interrupts are executed in their own hardware and software context, to which effect the latter context is temporarily activated, and after execution of the interrupt procedure restored to its previous status. In this way dialog with the peripheral may be executed real-time, while the "own" context greatly facilitates programming. An upgraded driver program is also presented.

5 Claims, 5 Drawing Sheets

| | | |
|---|---|---|
| 120 — UCB EXTENSION DEFINITIONS | 155 — 295 |
| 122 — DEVICE REGISTER DEFINITIONS | 297 — 353 |
| 124 — DRIVE PROLOGUE TABLE | 380 — 410 |
| 126 — DRIVE DISPATCH TABLE | 412 — 422 |
| 128 — FUNCTION DECISION TABLE | 425 — 432 |
| 130 — CONTROLLER INITIALIZATION ROUTINE | 439 — 483 |
| 132 — UNIT INITIALIZATION ROUTINE | NOT USED |
| 134 — FDT ROUTINES | 488 — 669 |
| 136 — START ROUTINES | 675 — 1049 |
| 138 — INTERRUPT SERVICE ROUTINE | 1054 — 1851 |
| 140 — CANCEL I/O ROUTINE | 1944 — 2093 |
| 142 — DEVICE REGISTER DUMP ROUTINE | 2097 — 2151 |

FIG. 6

MULTIPROCESS COMPUTER AND METHOD FOR OPERATING SAME HAVING CONTEXT SWITCHING IN RESPONSE TO A PERIPHERAL INTERRUPT

This is a continuation of application Ser. No. 794,863, filed Nov. 4, 1985, now abandoned.

BACKGROUND OF THE INVENTION

The invention relates to a multiprocess computer and a method for operating same. Processes are divided into operating system routines which are controlled by respective application programs or modules thereof and user processes that are executed with respect to executing a user-required function. A typical non-limiting example, for which the invention was conceived and reduced to practice, is the VAX-11-750 Computer by Digital Equipment Corporation, Maynard, Mass., USA. Many aspects of the operating system or so-called executive thereof are described in the book "VAX/VMS Internals and Data Structures", by L. J. Kenah and S. F. Bate, published by Digital Press, Bedford Mass. USA 1984.

1. Field of the Invention

In the VAX, and also in many other computers, as the use of the present invention is not at all limited to the VAX-system, the scheduling of process execution is done by the scheduler according to either of two principles:

a. the interrupt, which means that any process or routine which needs execution can interrupt any other process or routine being executed if the former process has a higher priority level than the latter. The priority level may be specified by hardware in that the interrupts arrive via specifically assigned leads, or in that the priorities are determined upon interrogation thereof by the operating system;

b. the normal scheduling, wherein a process or routine which no longer needs execution, relinquishes the use of the processor whereupon the processor determines which process or routine must now be activated. The latter process or routine may be one for which an interrupt of too low priority level had been earlier given with respect to the interruptibility of the currently executed process or routine. Alternatively, the next process or routine is taken up from a waiting list on initiative of the processor, in that the latter inspects whether such taking up is useful. If it is not, the processor takes up the next process or routine according to some predetermined order of priority. If the waiting list is empty, a so-called "null process" is activated.

Operating system routines usually are provided with an interrupt feature. The highest interrupt priority level is the "power-down-signalization". Lower interrupt priority levels relate to I/O-handling. Operating system routines are executed in system context. User processes usually are not provided with an interrupt feature, so that they are only executed if the system software does not need activation.

2. Description of the Prior Art

It has been found that certain user processes need instant attention and could not wait until execution of all system software or other user processes of a higher priority. The process is scheduled by the system software and is the basic entity of the sequence of states assumed by the computer: it contains the address space and hardware and software context currently relevant. The process therewith comprises: a program, privileges, and other boundary conditions, if relevant; and also an address translation table and a dump space, indicating where results and data generated must be intermediately dumped if necessary. The solution in VAX is the following, see, e.g. the cited book, page 115 ff. ("Connect to interrupt mechanism") One application program module may be assigned a higher priority level in that it is allowed the interrupt feature at a higher level than the one(s) associated to the normal scheduling. The effect is that a physical memory section associated to said one program module, containing data and/or code, is put in the virtual address space of the system software. This renders said module executable. This has the following drawbacks:

a. The context, i.e. the contents of specific hardware registers, etcetera, remains unaltered upon the activation of this particular user program module. This severely limits the flexibility of the execution in that the knowledge on the point where the execution had been terminated during the most recent activation of the module is not present in the locations normally reserved therefor. In transferring from one program module to another program module, such hardware registers are conveniently used to exchange information with stacks and other dedicated provisions.

b. In execution of the activated program module, the content of the remainder of the virtual address space of the processor remains unaltered, and incompatible to the program module in question. For example, segment-table and other address-tables do not have their content updated. Therefore, the code may not refer to information outside the physical memory section referred to above. Again, this frequently hampers flexibility in programming to a great extent.

SUMMARY OF THE INVENTION

The present invention mitigates the disadvantages of the earlier solution in that for predetermined interrupt signals associated with a specific peripheral high priority level is assigned to allow instant activation. This means that the related activity can really interrupt many kinds of operating system routines having a lower interrupt priority level. In this way a dialog with this peripheral may be executed in real-time and the optimum context to the process in question is present and accessible. One specific example is a magnetic resonance imaging apparatus for medical diagnostic use for which a delay of an attention or completion interrupt would necessitate certain measurements on patients to be repeated which could cause distress, loss of apparatus time and/or increased cost.

The above must be distinguished from a different known strategy, i.e., the self-controlled rise of the priority level of a user process after it has been activated. This yields the process in question nearly uninterruptible which is useful in executing complicated tasks involving critical intermediate results or states. However this does not improve the real-time character of the interrupt. It is a specific object of the invention to enhance this real-time character.

BRIEF DESCRIPTION OF THE DRAWINGS

The invention is further explained with respect to the following Figures and Tables.

FIG. 6 shows the software blocks as components of the driver program.

Furthermore, a complete driver program print-out for said medical magnetic resonance imaging apparatus is appended.

THE ENVIRONMENT OF THE INVENTION

Figure 1:
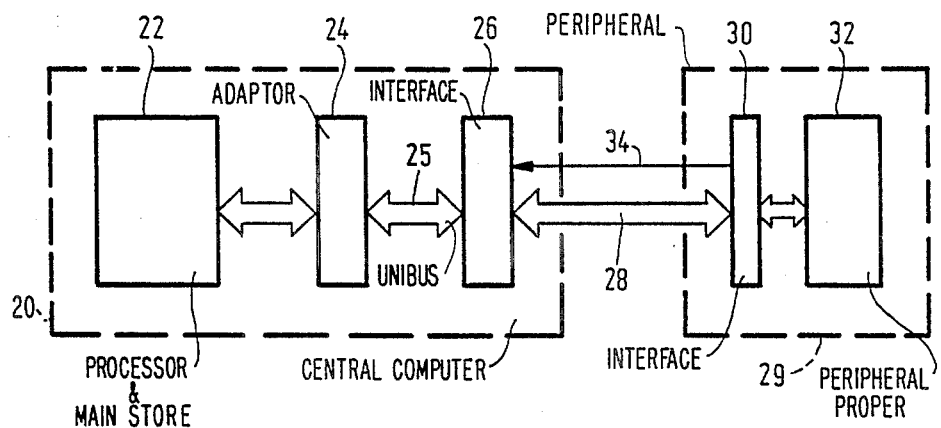
FIG. 1 is a block diagram of a computer for use with the invention.

FIG. 1 is a block diagram of a computer for use with the invention, for example, a VAX-11-750-Computer, provided with a VAX/VMS operating system of release 3.7. The central computer 20 is provided with a UNIBUS-adaptor 24, a UNIBUS-interface 26, and further elements such as processor and main store, generally shown as block 22. The UNIBUS-proper is indicated by label 25; the bus can support a plurality of interfaces 26, each interface for an associated peripheral device. Peripheral device 29 is also provided with an interface 30 to element 26 and further elements 32, such as the peripheral function proper (I/O-function, control card). The computer-to-peripheral device connection 28 has a physical multiplicity and may have an appreciable length in that the periperal device is situated at a remote location. Connection 28 is accompanied by an attention line 34 on which the peripheral device may signal that it needs attention from the central computer, e.g., in that it must transmit or receive data, or that a specific control must be executed. Interface element 26 receives the attention requesting signal and translates this to an attention interrupt to be forwarded to the processor. In certain cases a so-called "completion interrupt" may be generated by interface element 26. One applicable example is that a certain amount of data is being sent to peripheral device 29, while at the end of this transmission operation the processor must execute a certain function. Interface element 26 monitors the transport and at the end thereof independently generates this completion interrupt.

DESCRIPTION OF THE VARIOUS SCHEDULING PRIORITY LEVELS

Figure 2:
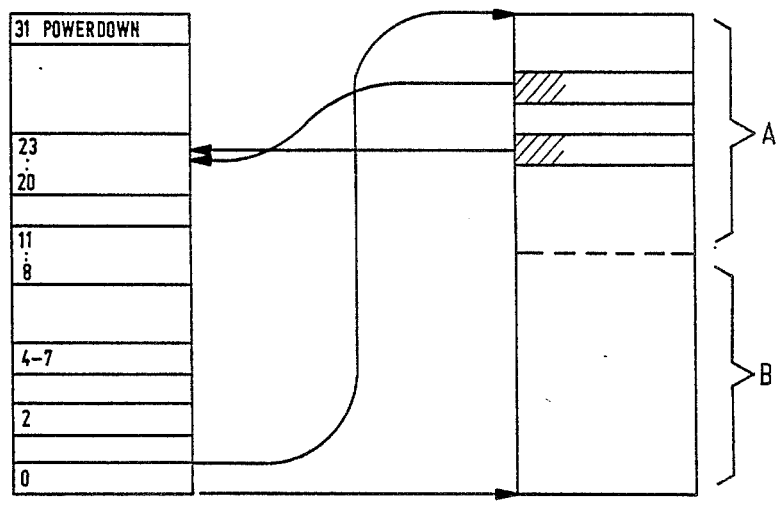
FIG. 2 explains the respective priority levels in the exemplary computer.

FIG. 2 explains the respective priority levels in an exemplary computer, to wit, the VAX-11-750-machines etcetera. The left hand block enumerates several of the maximum of thirty-two interrupt priority levels. Level 31 is the highest level and is activated by an electric power failure resulting in the execution of the power-down routine: upon activation, key information is saved into nonvolatile storage elements for allowing a controlled restart when power returns. Levels 20–23 are assigned to respective I/O-operations on the UNIBUS, which must be served fast, for example to avoid an "idle" state in a high volume printer or to accommodate reception of a block of data from a magnetic disk. Such operations may be, for example, start/stop operations controlled by a direct-memory-access (DMA) activity. The use of four sublevels allows one to give certain peripherals an interrupting power over other peripherals. Levels 8–11 are assigned to the necessary pre-processing and post-processing for such I/O-operations. An example of pre-processing is the calculation of a physical memory address where the next I/O-operation is to begin. An example of post-processing is the ascertaining of acknowledge signals to verify whether an output operation had been executed correctly. If such verification is deemed unnecessary, the post-processing in question may be omitted. Each level is assigned to a particular peripheral or group of peripherals so that the input/output processes also in this respect have interrupting power among themselves. In certain cases, principle levels 8–11 and 20–23 may be combined to a single group of levels, or even to a single level. If two processes have the same interrupt priority level they cannot interrupt each other in either of the two directions.

Levels 4–7 are assigned to the processes of the context switching to accommodate the context, e.g. hardware register contents to a newly activated process. The associated interrupt may be activated, e.g. by the clock if non-real-time processes are awoken and put to sleep, respectively, at the beginning and end of their assigned time slices. In the case of a real-time process requiring an I/O-operation, the real-time process in question initates the associated interrupt. The specific meaning of real-time in prior VAX-usage is explained below.

Level 2 is assigned to specific user program-originated program modules; the normal level for user programs is level zero, which of course means that their facility to interrupt is only notional because there is no lower level where a potential victim program could have operated.

The user software generally operates without interrupt facilities and is interruptable by all levels of 1 and up. Besides the levels of interrupt priority shown, others may be implemented or left unoccupied by intent.

The right hand side of FIG. 1 explains the two normal levels of user program execution. The software modules in region A are called "real-time". In fact, they are interruptable by all higher interrupt levels; however, they have a specific feature, in that execution proceeds (when uninterrupted) as long as processing is usefull. In contradistinction, processes in region B are only assigned time slices of predetermined length and upon attaining the end of the time slice, execution is terminated anyway.

A specific feature of the VAX-operating system is that one user program in either category A or B may be quasi-real-time, in that it is assigned a higher interrupt level. However, this involves no context switching and this generally narrows the scope of possible activities or complicates the programming in that the necessary context must be present in the software itself. The invention alleviates the problems, by modifying the software, in particular the driver program of the peripheral device in question. The specifics of this modification will be described hereinafter. The allocating of a raised priority level to the user process in question has been indicated by an arrow from the user process (drawn by hatching) to interrupt priority levels 20..23 in the left hand block. As shown in FIG. 2, two or more different user processes may have a high priority level assigned a high priority level. The resulting level need not be in the same region, while in principle a user process of region B could also have a higher priority level assigned. If required, all these latter user processes could have the context switching.

DESCRIPTION OF A PREFERRED EMBODIMENT

Now, the invention may be based on exclusively software measures. This results in a physical limitation to the functioning of the computer, in that a certain peripheral may now be really real-time driven, and therefore can function more adequately. In certain critical situations, proper functioning without the practising of the present invention, according to earlier practice would be impossible, or would anyway required intricate programming in machine language (macro). According to the present invention the interrupt service routine may be written in a so-called high-level language. One of the few requirements would be that all code and data that could be used in executing this interrupt service routine were present in main storage, because the improved software would care for all virtual addressing. However, if the driver were to start the interrupt service routine with part of these code/data in background store, (e. g. magnetic disc) then the system would go into a "crashed" state.

Figure 3:
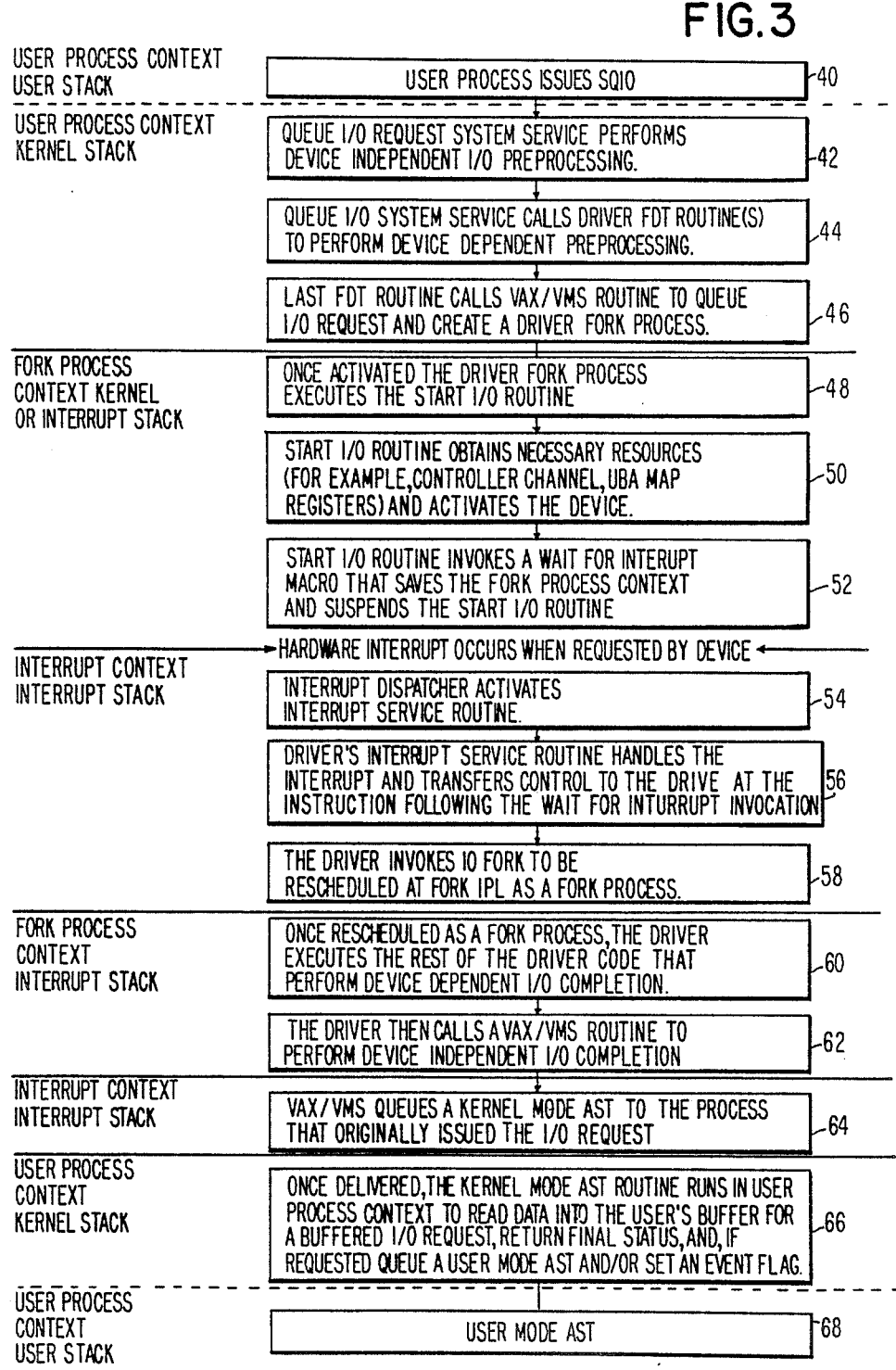
FIG. 3 is a block diagram of a driver execution sequence.

FIG. 3 for reasons of recapitulation gives a block diagram of a driver execution sequence. The driver is the control program in the central computer for the peripheral device in question. Express reference is had to the series "VAX/VMS Software", in particular Volume 9 of the 3.0 release, produced by DEC. The changes to release 3.7 have been included in the present disclosure if and when relevant. Page 1.3 of the chapter "Guide to writing a device driver" lists substantially all important call categories to driver routines:

I/O-operation set-up;
Controller initialization;
Device unit initialization;
Start I/O-operation;
Service device interrupt;
Cancel I/O-operation;
Log device errors.

The present invention deals substantially with the fifth of the categories. At left in FIG. 3 a listing is shown of the actual context in which the processor executes, and of the actual stack, i.e. main storage area which can be used for temporarily dumping a program counter position of an incomplete process for allowing later return. The listing starts when in block 40 the user process issues an I/O-request (DOL QIO). Blocks 42–46 are the first steps of the I/O-servicing where the preprocessing takes place, still in the user process context. Blocks 48–52 complete the initial operations before starting the actual I/O-operation. Blocks 54–62 are the realm of the driver wherein the invention would produce enhancement. Notably, blocks 54, 56, 58 refer to the beginning of an interrupt operation. Blocks 60, 62 refer to the terminating of an I/O-operation. The combination of interrupt context and fork process context is a system-determined context and not a user process context. Therefore, as seen from the left hand column, never will the user process context appear in the way the prior art would handle this interrupt. The latter process only reappears in blocks 66, 68, but this is only after the initial interrupt operations had been executed. Finally in blocks 68 an asynchronous trap routine is executed at the low user level.

Figure 4:
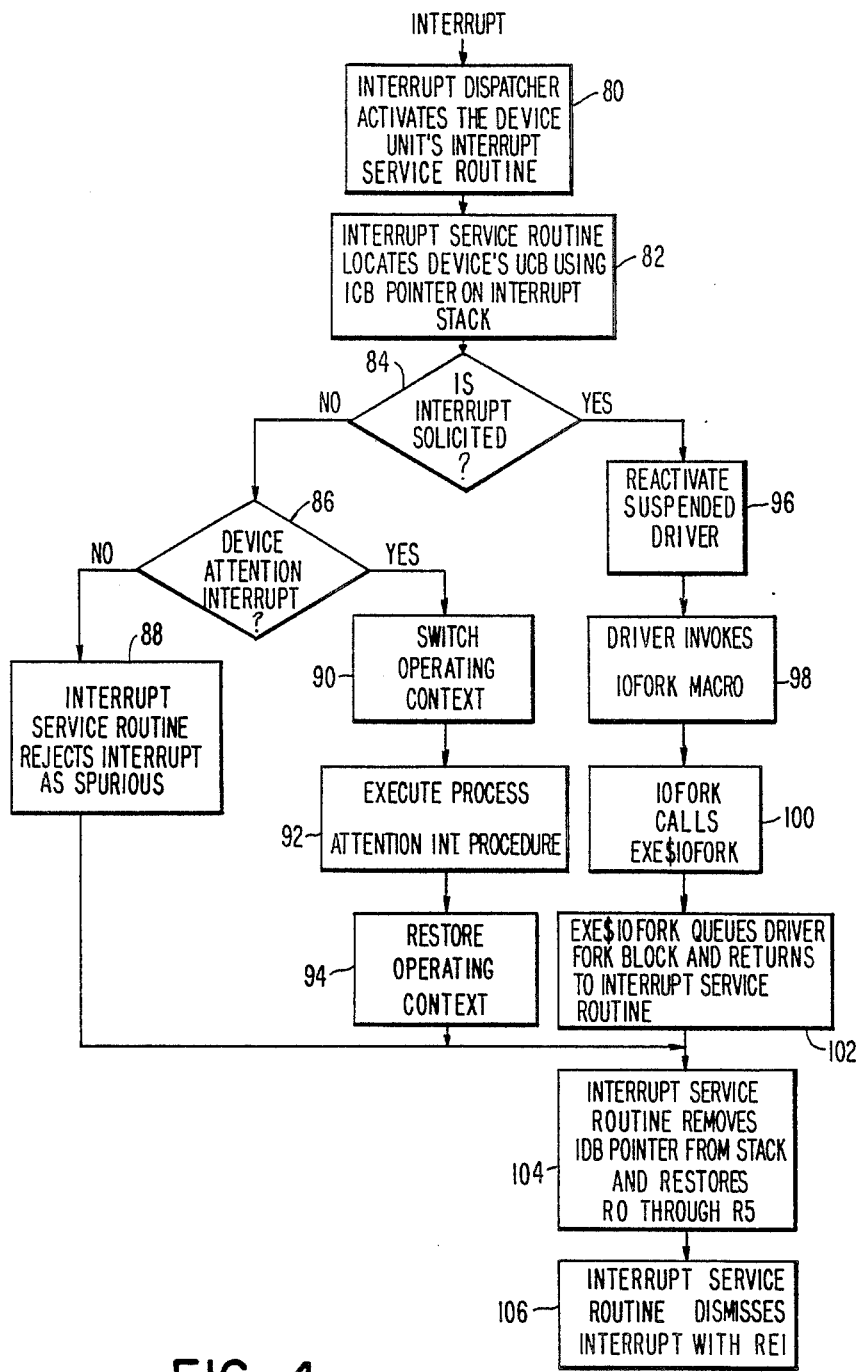
FIG. 4 is a modified flow chart relating to an attention interrupt servicing by the driver.

FIG. 4 is a modified flow chart according to the invention relating to an attention interrupt handling. In fact, it is an extension to page 11.2 of the cited "Guide to writing a device driver" chapter, and would represent a modification of blocks 54–62 in FIG. 3. In fact blocks 80–84, 96–106 are replicates from this page 11.2. The flow chart is entered in block 80 via an interrupt. However, if the incoming interrupt has a priority level which is not higher than the level of the operation presently being executed, this interrupt is ignored and put on a waiting list for later processing. Furthermore, if the interrupt has emanated from an operating system routine, it is directly processed in the system context without entering this flow chart. In fact this flow chart is called "writing interrupt service routines" by DEC, which means that the system software is not influenced by such writing. The present invention imports a few changes into the system software, contrary to common usage of application software engineers who treat the system software as a kind of "black box".

In block 84 it is detected whether the interrupt was solicited by the system. If the interrupt is non-solicited and therefore autonomous, it is detected in block 86 whether it is a "device attention interrupt". This may be detected by specific data accompanying the interrupt proper, e.g. one or more signalling bits. The "attention" interrupt would in principle require immediate service. If it is not an attention interrupt, in block 88 the interrupt is rejected as spurious. However, if it is an attention interrupt, first in block 90 the context is switched to the one of the user process in question. Next, in block 92 the process attention interrupt procedure is executed. Finally in block 94 the context is switched back to the original one, and the system reverts to block 104 according to the known driver structure. (The latter also happens after block 88 has been traversed.) The prior art situation with respect to the left hand part of FIG. 4 is, for reasons of comparison, shown in the left hand part of FIG. 5. In writing an interrupt service there are two possible choices here: one is the block 88 as in FIG. 4, but without the detection of block 86. The other choice is shown by blocks 108, 110: here an appropriate action is taken. However, during execution of this action, no context switching is undertaken, with no changes in the virtual addressing organization.

Figure 5:
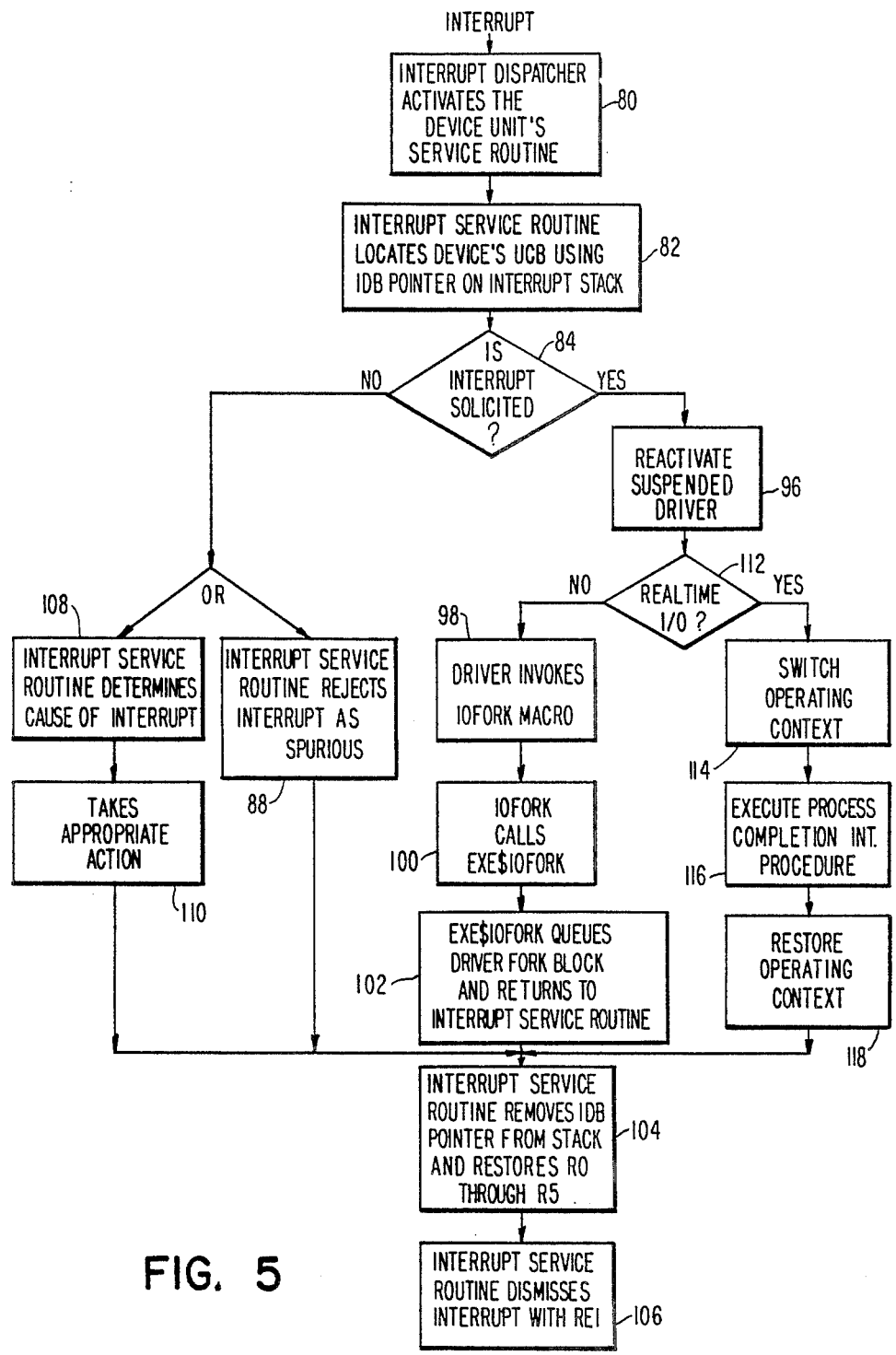
FIG. 5 is a modified flow chart relating to a completion interrupt servicing by the driver.

FIG. 5 is a modified flow chart relating to a completion interrupt handling. Blocks corresponding to FIG. 4 have corresponding numbers. Thus, blocks 80–84, 96–106 need no further consideration. FIG. 5 does not have the provisions for an attention interrupt as discussed with respect to FIG. 4. Thus, blocks 88, 108, 110 represent the state of the art with respect to handling such attention interrupt. In block 84 it is detected whether the interrupt was solicited, that is, whether the processor, as a result of some earlier outcome, had concluded that at some future instant this particular interrupt was to follow. In the positive case, after reactivation of the suspended driver (block 96) it is determined, whether the I/O-operation, being executed up till then, was provided with a higher priority to allow real-time interruptibility. If no, the normal sequence of blocks 98–102 ensues. If yes, blocks 114, 116, 118 are executed. These correspond closely to blocks 90, 92, 94, respectively, of FIG. 4, apart from block 92 wherein the process completion interrupt procedure is executed. Finally, all branches of the flow chart reunite into block 104.

FIG. 6 shows the software blocks as components of the driver program. Specific reference is had to the chapter "Template for an I/O-driver" of the cited manual, pages 6.5–6.8. Each block is provided with an identifier stating the essential functions of the block. The right hand column refers to the line numbers of the driver print-out annexed hereto. In block 120 UCB means "Unit Control block". In block 124 the location of the code or information for the operating system is indicated. Specifically, the context switch is executed under control of block 138. It should be noted that this picture is not a flow chart.

Finally, hereinafter, a print-out of a preferred driver embodiment is given. With respect to the specific embodiment given only the modification of FIG. 4 has been given therein. Specifically, block 90 of FIG. 4 has been implemented in lines 1741 through 1808 and lines 1848 through 1851. Block 94 of FIG. 4 has been implemented by lines 1812 through 1851 (the lines 1848–1851 being common to blocks 90, 94). In the embodiment only provision was made for one peripheral device.

What is claimed is:

1. In a computer having a processor, a plurality of system operating routines and a plurality of user processes associated with a peripheral device, driver routines for generating a corresponding attention interrupt or completion interrupt for said user processes, activation means for sequentially activating said system routines and said user processes comprising terminating means for terminating an activation upon reaching a predetermined point in each said process or system routine and scheduling means for determining the next user process or system routine to be activated, wherein the improvement comprises:

said computer having a preferential user process having a predetermined high interrupt priority level corresponding to a preferentially treatable peripheral device, said preferential process having a process context;

a main store external to said processor comprising attention interrupt routines for servicing attention interrupts of said preferential process and completion interrupt routines for servicing completion interrupts of said preferential user process, all software code and data useable by said attention and completion interrupt routines being present in said main store;

a driver routine comprising first detecting means for detecting whether an interrupt is a completion interrupt from said preferred peripheral, second detecting means for in the negative case detecting whether an attention interrupt was received, means in response to the detection of an attention interrupt for saving the process context corresponding to the terminated activation in said main store and for reading from said main store said preferential user process context, means for activating the attention interrupt service routine corresponding to said preferential user process, and means for reading from said main store the process context of said terminated activation upon completion of said attention interrupt routine, and means responsive to the detection of a completion interrupt by said first detecting means for activating a suspended driver corresponding to said preferential user process in response to a completion interrupt signal, third detection means for detecting whether the completion interrupt routine is in need of real time processing, means in the positive case for saving the process context corresponding to said terminated activation in main store and for reading from said main store said preferential user process context, means for activating the completion interrupt routine, and means for reading from said main store the process context of said terminated activation upon conclusion of said completion interrupt routine.

2. A method of operating a multiprocess computer having a driver program for specifying a predetermined attention interrupt as being instantaneously serviceable for a preferential user process corresponding to a preferentially treatable peripheral device having a predetermined high interrupt priority level, a processor, and a main store external to said processor comprising an attention interrupt service routine corresponding to said preferential user process, all software code and data useable by said attention interrupt service routine being present in said main store, said method comprising the steps of:

(a) loading the driver program of said preferentially treatable peripheral device;

(b) sequentially activating said operating system routines and user processes while terminating a current activation by either (1) the completion of said current activation up to a predetermined point of the associated operating system routine or user process, whereupon a waiting list is accessed for determining an operating system routine or user process of highest priority in said waiting list awaiting activation, or (2) detecting an occurrence of an interrupt vector signal having a higher priority level than associated to said current activation and upon detecting of such interrupt vector signal detecting whether it is a solicited interrupt from said peripheral device, and in the negative case detecting whether an attention interrupt was generated in need of real-time processing, upon detecting such attention interrupt then saving the context of the current activation in said main store and reading the context of said preferential process from said main store, executing said peripheral's attention interrupt service routine on the prevailing high interrupt priority level and thereafter reading the context of the interrupted activation from said main store, but in case said interrupt vector signal had emanated from a source other than said preferred peripheral device or represented a non-instantaneously executable interrupt, maintaining the prevailing process context.

3. A method for operating a multiprocess computer having a driver program for specifying a predetermined completion interrupt as being instantaneously serviceable for a preferential process pertaining to a preferentially treatable peripheral device having a predetermined high interrupt priority level, a processor, and a main store external to said processor comprising a completion interrupt service routine corresponding to said preferential user process, all software code and data useable by said interrupt service routine being present in said main store, said method comprising the steps of:

(a) loading the driver program of said preferentially treatable peripheral device;

(b) sequentially activating said operating system routines and user processes while terminating a current activation by either (1) the completion of said current activation up to a predetermined point of the associated operating system routine or process, whereupon a waiting list is accessed for determining an operating system routine or user process of highest priority in said waiting list awaiting activation, or (2) detecting an occurrence of an interrupt vector signal having a higher priority level than associated with said current activation and upon detecting of such interrupt vector signal detecting whether it is a solicited interrupt from said peripheral device, and in the positive case reactivating the suspended driver of the preferred peripheral and detecting whether a completion interrupt was generated in need of real-time processing, upon detecting such completion interrupt then saving the context of the current activation in said main store and reading the process context of said preferential process from said main store, executing said preferred peripheral's completion interrupt service routine on the prevailing high interrupt priority level and thereafter reading the context of the interrupted activation from said main store, but in case said interrupt vector signal has emanated from other than said preferred peripheral device or represented a non-instantaneously executable interrupt, maintaining the prevailing process context.

4. A multiprocess computer, comprising:

(a) a processor;

(b) a main store external to said processor for storing operating system routines and user processes, said user processes including at least one process corresponding to a preferentially treatable peripheral device having a predetermined high interrupt priority level, said main store comprising a driver program for said preferentially treatable device for specifying a predetermined attention interrupt of said peripheral device as being instantaneously serviceable, an attention interrupt service routine corresponding to said one user process, and all software code and data useable by said attention interrupt service routine;

(c) sequencing means for sequentially activating said operating system routines and said user processes;

(d) a context switching routine for saving in said main store the context of a current activation and for reading from said main store the process context corresponding to said preferred peripheral;

(e) termination means for terminating activation of an activated operating system routine or user process under control of either (1) a termination signal generated by the currently activated operating system routine or user process upon obtaining a predetermined point of the latter routine or process, said signal furthermore controlling accessing a waiting list means for determining an operating system routine or user process of highest priority therein awaiting activation, or (2) an interrupt vector signal having a higher priority level than associated to the current activation, (f) said driver routine comprising means responsive to said interrupt vector signal for activating said attention interrupt service routine corresponding to said preferential user process, a first detecting means for detecting whether said vector signal is a solicited interrupt from said preferred peripheral device, a second detecting means for in the negative case detecting whether an attention interrupt was received, and means for activating said context switching routine in the positive case for reading from said main store the process context corresponding to said preferred peripheral and activating said peripheral's attention interrupt routine on the prevailing high interrupt priority level, but under control of any other priority and under control of any other interrupt signal leaving said first routine deactivated.

5. A multiprocess computer as claimed in claim 4 further, comprising said main store having a completion interrupt routine corresponding to said preferred peripheral device, and a third detection means for upon a positive case signalled by said first detecting means reactivating a suspended driver program corresponding to said preferred peripheral and detecting whether a completion interrupt signal was generated in need of real-time processing, and means for activating said context switching routine in the positive case for reading from said main store the process context corresponding to said preferred peripheral and activating said preferred peripheral's completion interrupt on the prevailing high interrupt priority level, but under control of a negative detection result from said third detecting means leaving said context switching routine deactivated.

* * * * *